United States Patent [19]

Demus et al.

[11] Patent Number: 4,607,492

[45] Date of Patent: Aug. 26, 1986

[54] LINEAR ADJUSTING DEVICE

[75] Inventors: Wolfgang Demus, Langenbach; Reinhard Katterloher, Munich, both of Fed. Rep. of Germany

[73] Assignee: Max-Planck-Gesellschaft, Munich, Fed. Rep. of Germany

[21] Appl. No.: 673,044

[22] Filed: Nov. 19, 1984

[30] Foreign Application Priority Data

Nov. 30, 1983 [DE] Fed. Rep. of Germany ....... 3343340

[51] Int. Cl.⁴ .............................................. B01D 8/00
[52] U.S. Cl. .................................. 62/55.5; 248/626; 267/160; 267/164
[58] Field of Search ...................... 62/55.5, 100, 268; 55/269; 417/901; 267/44, 158, 160, 164; 248/626, 630

[56] References Cited

U.S. PATENT DOCUMENTS

| | | | |
|---|---|---|---|
| 1,162,956 | 12/1915 | Walsh et al. | 248/630 |
| 2,978,241 | 4/1961 | Plastow | 267/160 |
| 3,075,100 | 1/1963 | Efromson | 310/27 |
| 3,140,113 | 7/1964 | Williams | 267/160 |
| 3,185,428 | 5/1965 | Farabaugh, Jr. et al. | 267/160 |
| 3,572,906 | 3/1971 | Sotirios et al. | 350/269 |
| 3,935,486 | 1/1976 | Nagashima | 310/12 |

FOREIGN PATENT DOCUMENTS 1071962 12/1959 Fed. Rep. of Germany .
1541759 6/1965 Fed. Rep. of Germany .
2242825 3/1974 Fed. Rep. of Germany .

Primary Examiner—Ronald C. Capossela
Attorney, Agent, or Firm—Price, Gess & Ubell

[57] ABSTRACT

Figure 1:
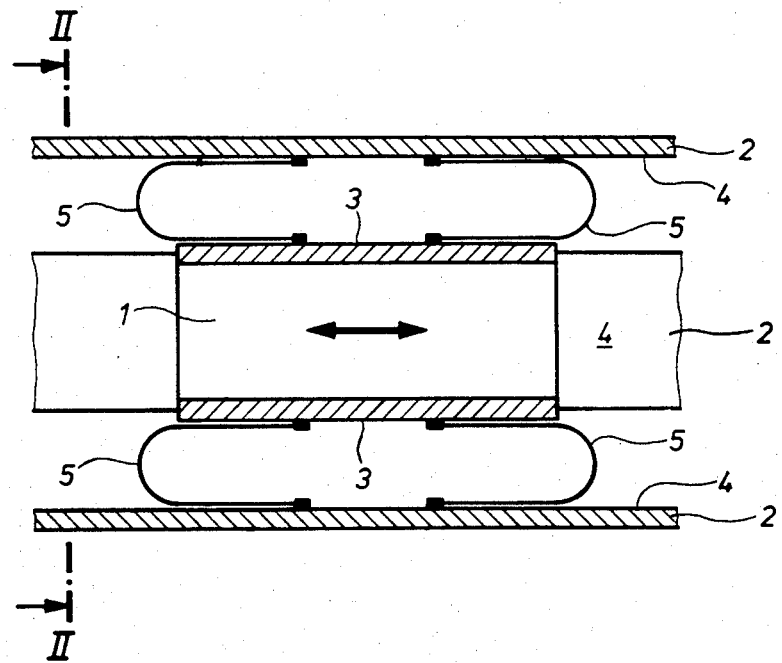

A linear adjusting device, especially for cryogenic temperatures and under vacuum conditions, having an adjusting body being adjustable on a carrier body along a linear adjusting path and supported by more than one bending springs placed between said carrier body and adjusting body and bent to have a U-like shape, the U-legs of each of the U-shaped bending springs extending longitudinally along the adjusting path, and at their free ends, one of the legs of each bending spring is fixed to said carrier body and the other leg to said adjusting body, said bending springs being arranged in at least two groups of bending springs consisting of at least two bending springs spaced apart by a given distance along said adjusting path, the bending springs of at least one of said groups of bending springs are arranged at oblique angles to the bending springs of another group of bending springs, when seen in a cross section perpendicular to said adjusting path (FIG. 1).

9 Claims, 5 Drawing Figures

LINEAR ADJUSTING DEVICE

The invention relates to al linear adjusting device, especially for use at cryogenic temperatures and under vacuum conditions, which has an adjusting body being adjustable on a carrier body along a linear adjusting path and supported on the carrier body by a plurality of strip-shaped bending springs which extend at least approximately in an U-shaped manner and are located between said carrier body and adjusting body, one of the two U-legs of the bending springs with its free end being attached to the carrier body, and the other leg with its free and to the adjusting body, the bending springs being arrangend in at least two groups each of at least two bending springs spaced apart by a given distance along said adjusting path.

BACKGROUND OF THE INVENTION

In known linear adjusting devices for great adjusting paths, the bearing elements between the adjusting body and the carrier body are formed as roll bodies. However, roller bearings of this type are not satisfactory for very small adjusting steps in the range of some micrometers, since the friction borne within them results in inaccurate adjustment as well as in uneven adjusting movement. Further to this, roller bearings used in linear adjusting devices are sensitive to dust and other contaminations, are subject to wear and they necessitate some kind of lubrication. With these features, difficulties have to be encountered especially under special environmental circumstances, such as extremely high or low temperatures, under vacuum conditions and agressive atmosphere etc.

However, also linear adjusting devices of the present kind are known (DE-review "VDI-Zeitschrift", Vol. 83, 1939, No. 45, p. 1194, 1195) in which the bending springs are arranged in such a way that the longitudinal direction of their U-legs extends perpendicular with respect to the adjusting path and that the adjusting movement occurs against the spring force. In this way, a simple parallel guide of the adjusting body is possible which, however, is suitable only for short adjusting paths. Further, the adjusting body has to be held against the forces of the bending springs in all its positions outside the balance position of the spring.

Further, a table is known (DE-AS 2440088) which can be two-dimensionnally adjusted within the micrometer range by means of four groups of bending springs, each group comprising two leaf springs bent into U- shape and being located in pairs at the opposite table sides in such a way that the plane of the U-legs of the leaf springs extends perpendicular with respect to the plane of the table and the longitudinal direction of the U-legs of the leaf springs extends along the respective table side. At each of two adjacent table sides an electro magnet is arranged as an adjusting drive which can be adjusted with respect to its magnetic force. Thereby, the table can be displaced according to the adjusted magnetic force of the electromagnets, staggered by 90°, in each direction within the plane of the table until the equilibrum between the magnetic forces and the springs forces of the leaf springs is reached. Also by this adjusting device only short adjusting paths can be achieved and the adjusting movement occurs against the spring force of the leaf springs.

The main objects of this invention are to provide a linear adjusting device of the type specified in the introductory part, which especially can also be used under extreme environmental circumstances, e.g. at cryogenic temperatures and under vacuum conditions, and which renders possible an adjustment nearly without friction, furthermore, which has a great guiding accuracy on long adjusting paths, works for a long durability practically without maintenance and is in principle adapted—in spite of the long adjusting path—for adjusting steps within micrometers as well as for very slow, stable and very smooth adjusting movements.

According to the improvement in the present invention, the U-legs of each of the bending springs extend longitudinally along the adjusting path, and the bending springs of at least one of said groups of bending springs are arranged in such a way that the vertex lines of their U-bends—when seen in a cross section being perpendicular to said adjusting path—extend at oblique angles to the vertex lines of the U-bends of the bending springs of another group of bending springs.

In the linear adjusting device as in this invention, the U-bend of the strip-like bending springs fixed in U form will be displaced along its longitudinal direction as a chain track or caterpillar band during the adjustment motion of the adjusting device.

For this, one of the U-legs of the bending spring will become shorter in the course of the displacement and the other one will become longer. In this way, only an elastic deformation of the bending springs occurs in the course of the adjustment of the adjusting body, and there is no friction at the U-bend during the displacement. Further, the adjusting motion of the adjusting body is directed perpendicular to the spring forces of the bending springs. Accordingly, no spring force of the bending springs acts against the adjusting motion.

Since an inner friction within the bending springs will not be borne until the bending flexibility of the bending springs is not exceeded, it is possible to provide an adjusting device according to this invention which has a very easy and smooth running assuming a proper bending flexibility of the springs. This fact remains also true when the adjusting device is operated at cryogenic temperatures at which, indeed, the coefficient of elasticity will generally be greater, but which is expedient for the rigidity of the bearing.

As it is already mentioned, the adjustment of the adjusting body arises from the chain track like displacement of the U-bends of the bending springs which can be realized in very small adjusting steps. Thus, the linear adjusting device according to this invention is especially adapted for very small adjusting steps being in the range of e.g. some micrometers. At the same time, adjusting steps in the range of some decimeters are possible, too. Further to this, the linear adjusting device is suitable for extremely slow and steady adjusting speeds in the range of e.g. some micrometers per second on the base of the deformation mechanism of the bending springs achieved in this invention.

Furthermore, the adjusting device according to this invention needs no lubrication and, thus, it can be used not only at the lowest temperatures but under other extreme conditions, too, such as high vacuum or high temperatures. Moreover, the adjusting devices as in this invention works with stable effect independently from heat dilatation and is not sensitive against contaminations since the deformations of the bending springs will not be effected by contaminants.

The bending springs arranged according to the invention take charge of the supporting as well as guiding of the adjusting body, and the guiding forces are transmitted in a cross sectional direction being perpendicular to the direction of bending of the springs, i.e. to the direction in which the ends of the springs are bended towards each other for having the U-like form. In this cross sectional direction, the springs have, in relation to the bending direction, a greater rigidity because of having a greater width than thickness. Further to this, the guiding forces are distributed under the springs having identical measurements in a uniform manner.

Since in every group of bending springs, more than one bending springs are arranged one behind the other parallel to the adjusting path, they counteract to angle deflections of the adjusting path and parallel to the bending direction of the springs. Nevertheless, the springs of at least one group of bending springs are arranged, in respect to the springs of another group of bending springs, under oblique angles when seen in cross section, thus, to these angle deflections will also be counteracted.

Taken as an example, three groups of bending springs can be provided, two of which are arranged on both sides of the adjusting path in a manner, that the vertex lines of the U-bends of the bending springs of these two groups of bending springs will pass vertically. The third group of of bending springs is arranged in the middle between these two groups of bending springs in a manner that the vertex lines of the U-bends of their bending springs will pass horizontally.

However, preferably, the groups of bending springs are distributed between the adjusting body and the carrier body in a way, that they will be located on the sides of an imaginery polygon when seen in a cross section of the adjusting body and the carrier body perpendicular to the adjusting path, and the number of corners of the polygon will correspond to the number of groups of bending springs. As a result of this arrangement of bending springs around the adjusting body, the torsional rigidity of the support of the adjusting body will be enlarged and a stable guidance will be reached.

It is further preferred to arrange four groups of bending springs between the adjusting body and the carrier body along the sides of a rectangle seen in a cross section being perpendicular to the adjusting path and which groups have an angle of 45° in respect to the vertical also seen in this cross section. In this way, the bending springs having identical measurements cooperate in the guidance as well as in the support of the adjusting body.

For the band-like bending springs, the requirements of having small resistance to bending in the sake of a small bending radius and, thus, a compact structure as well as of having a highest possible cross rigidity for transmitting high guidance and support loads exist. With metallic constructions materials preferred as materials of the bending springs, the small resistance to bending can be reached by an as small thickness of the springs as possible. With this, however, the torsional rigidity of the bending springs will also be smaller resulting in a smaller cross rigidity of the bending springs. For reaching a great cross rigidity with this bending springs, cross ribs being perpendicular to the adjusting path are arranged on the whole free length of the band-like bending springs in an equdistantial manner. In this way, torsion of the bending springs can occur only on the areas without reinforcement between the cross ribs and, thus, the cross rigidity will be determined by the arrangement and the number of cross ribs.

The cross ribs are made as solid ribs and they can have a half-circular or a triangular or, especially, a rectangular form. With this, it is possible to form the cross ribs only on one side of the bending springs, especially on the inner surface of the U-bends of the bending springs. For a still greater cross rigidity, it is preferred to provide a great number of this cross ribs on both sides of the band-like bending springs, wherein the cross ribs on one side of the bending springs coincide with those on the other side or the cross ribs on one side of the bending spring are staggered in respect to the cross ribs on the other side, a small distance is left free.

The bending radius of the U-bends of the bending springs are chosen to permit only elastical deformation of the bending springs, thus, inner friction on the basis of plastical deformation of the bending springs will not arise.

In the most preferred case the bending springs can be formed as rectangular leaf springs. However, it is also possible to make them of parallel bands arranged side by side spaced somwhat apart and connected to each other by e.g. the cross ribs for having the springs a ladder-like form.

In the adjusting device according to this invention, it is also possible to arrange more than one bending springs as in this invention in side by side relationship. Further to this, a substantial freedom is given for the relative positions of the groups of bending springs to each other. They can have a smaller as well as a greater distance between them according to the given requirements of the adjusting body. The adjusting body can be a pointer of a measuring instrument, a core of a solenoid or another adjusting member. Furthermore, the adjusting body may be a means carrier having a rod-like or plate-like or another shape.

In all groups of bending springs, at least two bending springs arranged according to the invention are provided. The U-bends of the bending springs in the groups of bending springs may point in the same direction or they may be turned away from each other. Preferably, however, the U-bends of the bending springs in the groups of bending springs are turned towards each other and, thus, the distance between their fixing points on the adjusting body and the carrier body, respectively, is great.

The bending springs between the adjsuting body and the carrier body are arranged in such a way that the vertices of the U-bends are aligned perpendicular to the adjusting path in all adjusting positions of the adjusting body. Further to this, it is also possible in the adjusting device according to this invention to arrange the bending springs between the adjusting body and the carrier body in a manner that they do not touch the adjusting or carrier bodies, respectively, expect at the ends of the spring, at which the springs are fixed on the on the adjusting body and the carrier body, respectively. However, lay-down tracks for the U-legs of the springs may be provided on the adjusting body and the carrier body along the adjusting path wherein a lay-down track of the adjusting body forms with another lay-down track of the carrier body a pair of lay-down tracks. Between the lay-down tracks of this pair of lay-down tracks, one group of bending springs is arranged, the U legs of which lie on the respective lay-down track. In this embodiment, this results in the fact that during the adjustment, the U leg getting longer by running out of the U-bend of the bending spring is laid down onto the associated lay-down track and the other U leg getting shorter by running into the U-bend of the bending spring is lifted off the associated lay-down track. By leaning the U legs of the bending springs against the lay-down tracks, the accuracy of guidance can additionally be improved.

The surface lines passing planewise perpendicularly to the adjusting path of each of the lay-down tracks are stright lines being parallel to each other. However, the lay-down tracks need not to be straight and parallel ones to the adjusting path along it, only it has to be provided that the bending springs unrolling on the lay-down tracks will placed always be perpendicular to the adjusting path. However, it is more preferable that the lay-down tracks run in parallel to the adjusting path and the lay-down tracks of each pair of lay-down tracks are parallel to each other.

As it is already mentioned, the adjusting device in this invenion is especially adapted for achieving small adjusting steps, for the purpose of which a properly controlled adjusting drive may be provided. However, it has been found that longitudinal oscillations of the adjusting device of this invention may occur, especially with slow adjusting motions. With respect to this, it is proposed in another embodiment of this invention to use an electromechanical linear motor as adjusting drive being controlled with active oscillation absorption. The main idea of such types of control is per se well known, e.g. for active electromagnetic bearings. In this, it will be actively counteracted to the oscillations by producing counterforces through the control which absorb the oscillations of the adjusting member. Especially through this kind of active oscillation absorption of the linear motor, the adjusting accuracy within some micrometers and the extremely slow and stable adjusting speeds of the adjusting device according to this invention can be reached. Because of this, it is also important to guide the linear motor's slide fixed or attached to the adjusting body without friction and, thus, to avoid an influence of the guidance or bearing of the slide of the linear motor on the friction-free guidance of the adjusting body.

DETAIL DESCRIPTION OF THE DRAWINGS

Figure 2:
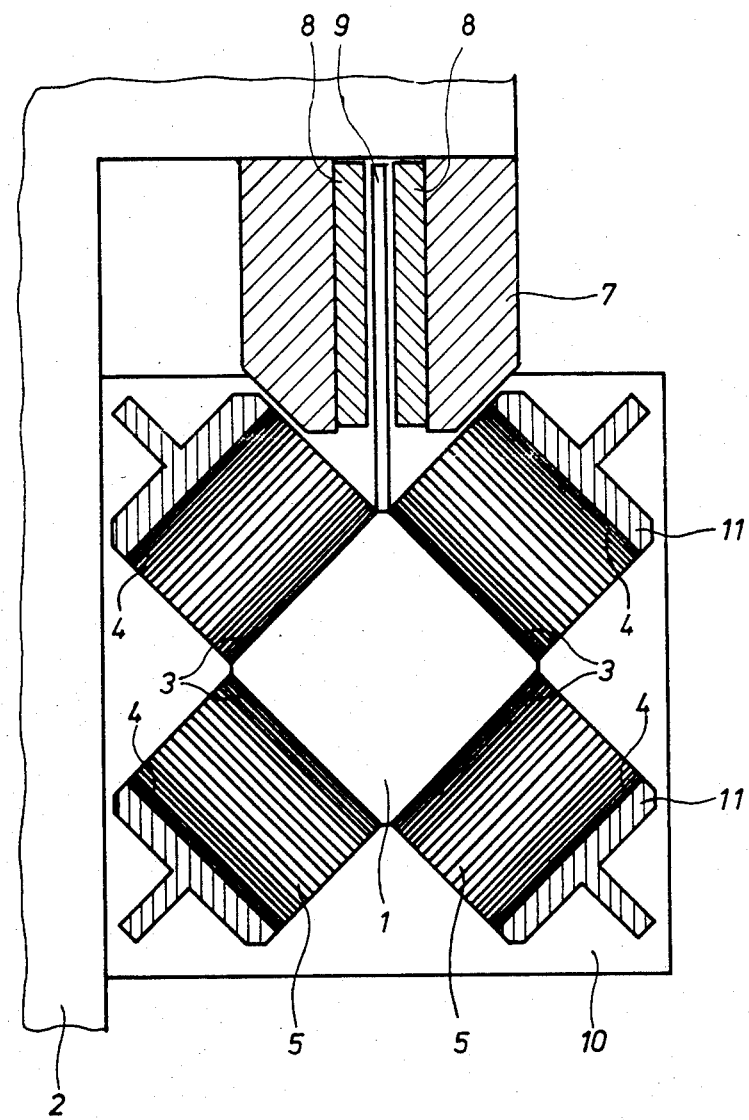
Figure 3:
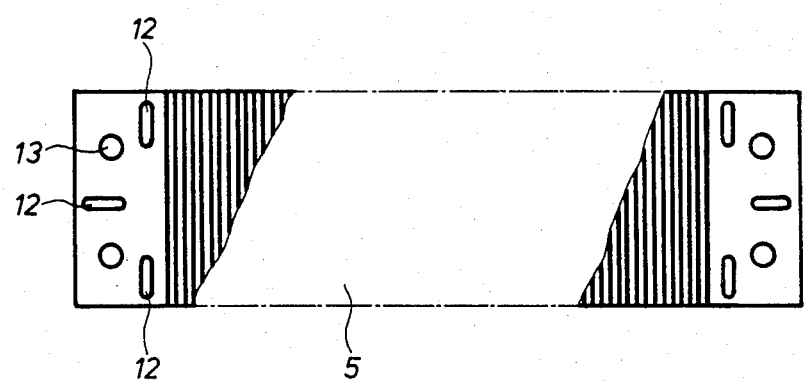
Figure 4:
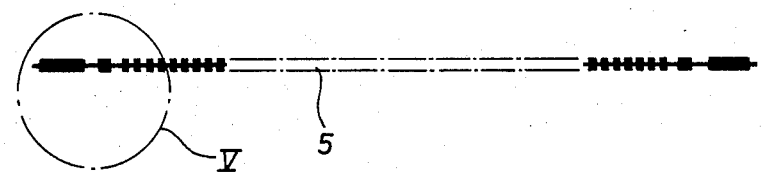
Figure 5:
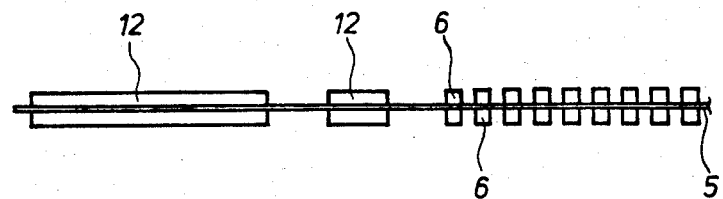

An embodiment of the invention is described hereunder in some detail with reference to and as illustrated in the accompanying drawing, in which:

FIG. 1 is a longitudinal section of a linear adjusting device according to the invention, FIG. 2 is a cross section according to line 11—11 of FIG. 1, FIG. 3 is a fragmentary plan view of a bending spring of the linear adusting device, FIG. 4 is a side elevational view of the bending spring of FIG. 3, and FIG. 5 is the detail V of FIG. 4 in enlarged scale.

As it is clearly shown in FIGS. 1 and 2, the linear adjusting device has in this embodiment a carrier body 2, on which four straight lined rails 11 with plate-like form are provided. Seen in cross section, rails 11 are arranged symmetrically to each other along the sides of a square and fixed by supporting plates 10 on carrier body 2. In the middle between rails 11, an adjusting body 1 having in cross section a quadratical, in longitudinal section a rectangular form is arranged which is adjustable in linear direction along its longitudinal axis. Insides of rails 11 and outsides of adjusting body 1 form lay-down tracks 3,4 for the legs of bending springs 5 arranged between rails 11 and adjusting body 1.

Each lay-down track 3 of adjusting body 1 forms with the adjacent lay-down track 4 of carrier body 2 a pair of lay-down tracks, both lay-down tracks 3,4 of which pass in parallel to the longitudinal axis of adjusting body 1 and coinciding with each other with parallel surfaces spaced somewhat apart for each other. According to FIG. 2, they have an angle of 45° with respect to the vertical when seen in cross section.

Between lay-down tracks 3,4 of each pair of lay-down tracks, two bending springs 5 are arranged spaced apart in the longitudinal direction of lay-down tracks 3,4. Bending springs 5 are formed as rectangular bands bent into an U-shape when placed between lay-down tracks 3,4 of the respective pair of lay-down tracks. Thus, the U legs of them are parallel to lay-down tracks 3,4 and lean against the associated lay-down tracks 3 or 4. Free longitudinal ends of the U-legs of strip-shaped bendingsprings 5 are fixed to lay-down tracks 3 and 4, respectively, along the whole strip width. In the embodiment shown in FIG. 1, both bending springs 5 between lay-down tracks 3,4 of each pair of lay-down tracks are arranged for having their U-bend turned away from each other, and the longitudinal ends turned against each other of their U-legs are spaced apart in longitudinal direction of lay-down tracks 3,4. Further to this, the distance between the longitudinal ends of the U-legs of bending springs 5 fixed on adjusting body 1 and the longitudinal middle of adjusting body 1 is in this example the same for all bending springs 5 which, furthermore, are made to be identical.

In FIG. 1, the middle position of adjusting body 1 is shown. Out of this middle position, adjusting body 1 can be moved along its longitudinal axis, in both directions, according to the double arrow shown, for a length limited by a measure predetermined by the free length of bending springs 5. During this adjustment, the U-bends of bending springs 5 are displaced along their length, and, thus, one U-leg will get longer and its portion running out of the U-bend will be laid down vertically on the associated lay-down track 3 or 4. The other U-leg of bending springs will become shorter, and its portion r into the U-bend will be lifted off from the associated lay-down track 3 or 4.

As it is apparent from FIGS. 3 to 5, bending springs 5 are provided with cross ribs 6 on both sides of their surface sides for enlargening the cross rigidity of them. Cross ribs 6 are perpendicular to the longitudinal axis of bending springs 5. They are distributed on the length of bending springs 5 for having an equal small distance between them, and the cross ribs 6 on one side of bending springs 5 are located there, where the cross ribs 6 on the other side of bending springs 5 are located. They have a quadratical cross section. In the embodiment shown in the figures, their thickness and width correspond to the width of the space between them. At their longitudinal end portions, bending springs 5 are provided with centering projections 12 and fastening bores 13 for their centered fixation at the associated lay-down path 3 or 4. Thus, cross ribs 6 of the fixed bending springs 5 pass perpendiculary to the longitudinal axis of adjusting body 1. By cross ribs 6, the whole free length of fixed bending springs 5 is occupied.

Bending springs 5 as shown in FIGS. 3 to 5 are made e.g. of hardened CuBe band with a thickness of 0.05 mm and with electroplated Cu cross ribs 6 having the thickness and width of 0.5 mm. Bending springs have in this example a free bending length of 9.15 mm and a width of 35 mm.

In the embodiment illustrated in FIG. 2, the adjusting drive is an electromagnetical linear motor 7, a coil 9 of which serving as the slide is fixed to one corner edge of adjusting body 1. Coil 9 is arranged between two permanent magnets 8 fixed to carrier body 2 with a suitable clearance and, thus, without contact and friction. During its function, linear motor 7 is controlled with active oscillation absorption. With this, a delecately sensitive adjustment of adjusting body 1 in small adjusting steps within the range of some mictrometers, with very slow and stable adjusting speeds and without longitudinal oscillations of adjusting body 1 can be realized.

In the shown embodiment, adjusting body 1 is in the middle of rails 11 of carrier body 2. It will be appreciated, however, that adjusting body 1 and carrier body 2 are functionally interchangeable. With other words, an adjusting device could be provided wherein, inversely to what have been shown in the exemplified embodiment, rails 11 could serve as the adjusting body being supported and guided by carrier body from inwardly.

What we claim is:

1. A linear adjusting device, especially for cryogenic temperatures and vacuum conditions comprising:
    a carrier body defining a linear adjusting path;
    an adjusting body being adjustable on said carrier body along said linear adjusting path;
    a plurality of strip-like bending springs each being bent at least approximately into a U-like shape and placed between said carrier body and adjusting body, wherein the U-legs of each of the U-shaped bending springs extend longitudinally along the adjusting path, and at their free ends, one of the legs of each being spring is fixed to said carrier body and the other leg to said adjusting body, respectively, said bending springs being arranged in at least two groups of bending springs spaced apart by a given distance along said adjusting path, the bending springs of at least one of said groups of bending springs being arranged in such a way that the vertex lines of the U-bends thereof are directed—when seen in a cross section perpendicular to said adjusting path—at oblique angles to the vertex lines of the bending springs of another group of bending springs.

2. The linear adjusting device as claimed in claim 1, wherein said groups of bending springs are located on the sides of an imaginary rectangle when seen in a cross section of said adjusting body and carrier body perpendicular to the adjusting path.

3. The linear adjusting device as claimed in claim 2, wherein four groups of bending springs are arranged between the adjusting body and the carrier body, said four groups being located on the sides of a square when seen in a cross section perpendicular to the adjusting path, each group further having an angle of 45° relative to the vertical.

4. The linear adjusting device as claimed in claim 3, wherein the cross ribs are provided on both sides of the bending springs and the ribs on one side coincide with the ribs on the other side of the bending springs.

5. The linear adjusting device as claimed in claim 1, wherein said strip-like bending springs have cross ribs perpendicular to the adjusting path.

6. The linear adjusting device as claimed in claim 1, wherein each of said groups of bending springs consists of two band-like bending springs, the U-bends of which are turned towards each other.

7. The linear adjusting device as claimed in claim 1, wherein each of the U-legs of said bending springs leans against a lay-down track provided along the adjusting path and formed on said carrier body and on said adjusting body, respectively.

8. The linear adjusting device as claimed in claim 1 further including an adjusting drive for said adjusting body, wherein said adjusting drive comprises an electromagnetic linear motor having a slide attached to said adjusting body and guided without friction.

9. The linear adjusting device of claim 8 further including means for controlling said linear motor in an active oscillation absorption mode.

* * * * *